US006813676B1

United States Patent
Henry et al.

(10) Patent No.: US 6,813,676 B1
(45) Date of Patent: Nov. 2, 2004

(54) HOST INTERFACE BYPASS ON A FABRIC BASED ARRAY CONTROLLER

(75) Inventors: Russell J. Henry, Wichita, KS (US); Bret Weber, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 474 days.

(21) Appl. No.: 09/916,773

(22) Filed: Jul. 27, 2001

(51) Int. Cl.[7] .............................................. G06F 13/00
(52) U.S. Cl. ..................... 710/316; 710/315; 711/114; 370/396
(58) Field of Search ................................ 710/316, 317, 710/105, 315; 711/114, 112; 379/219; 370/395.1, 466, 352, 419, 218, 400, 467, 422, 395.72, 362, 396

(56) References Cited

U.S. PATENT DOCUMENTS

| | | | | |
|---|---|---|---|---|
| 5,570,348 A | * | 10/1996 | Holden ........................ 370/236 |
| 5,777,994 A | * | 7/1998 | Takihiro et al. ........ 370/395.53 |
| 5,991,295 A | * | 11/1999 | Tout et al. ................ 370/395.7 |
| 6,067,286 A | * | 5/2000 | Jones et al. .................. 370/218 |
| 6,091,734 A | * | 7/2000 | Suzuki et al. ................ 370/410 |
| 6,542,954 B1 | * | 4/2003 | Aruga ......................... 710/316 |

\* cited by examiner

*Primary Examiner*—Gopal C. Ray
(74) *Attorney, Agent, or Firm*—Suiter West PC LLO

(57) ABSTRACT

The present invention is directed to a host interface bypass on a fabric based array controller. An apparatus of the present invention may include an external electronic device suitable for performing a function, a controller and a fabric connection. The controller includes at least one internal module, the internal module providing a controller function. The fabric connection communicatively connects the external device to the controller, wherein the module of the controller is directly accessible by the external electronic device.

18 Claims, 5 Drawing Sheets

HOST INTERFACE BYPASS ON A FABRIC BASED ARRAY CONTROLLER

FIELD OF THE INVENTION

The present invention generally relates to the field of electronic storage devices, and particularly to a host interface bypass on a fabric based array controller.

BACKGROUND OF THE INVENTION

Electronic data storage is one of the most important aspects of the modern economy. Most every aspect of modern life has some element that requires the storage of electronic data. Additionally, great advances have been made in the components utilized in information handling systems, such as desktop computers, servers, information appliances, convergence devices, and the like. For example, faster processors, network connection devices, memories, and the like are constantly available which enable components and the host system itself to provide increased functionality.

However, as host and drive interface bandwidth increases, a higher burden is placed on disk array controllers to increase bandwidth. Thus, advances made in other areas of electronic storage may not be realized due to these limitations. For example, typically, disk array controller architectures use peripheral connect interface (PCI) buses as the internal interconnect between functional areas. However, such buses may encounter limitations, such a connectivity, scalability and performance.

Additionally, in order to use multiple controllers to create a large storage complex, an I/O module may have to address all the host interface chips on the associated controllers, thereby making the interface very complex.

Therefore, it would be desirable to provide a host interface bypass on a fabric based array controller.

SUMMARY OF THE INVENTION

Accordingly, the present invention is directed to a host interface bypass on a fabric based array controller. The present invention may utilize a fabric interconnect, such as Infiniband, RapidIO, and the like. This may enable features such as dynamic expansion of modules, use of external memory system, scalability of memory systems and scalability and/or connectivity of array controllers to create big storage complexes.

In a first aspect of the present invention, an apparatus includes an external electronic device suitable for performing a function, a controller and a fabric connection. The controller includes at least one internal module, the internal module providing a controller function. The fabric connection communicatively connects the external device to the controller, wherein the module of the controller is directly accessible by the external electronic device.

In a second aspect of the present invention, an apparatus includes an external electronic device suitable for performing a function, a storage array controller, and a fabric connection. The storage array controller includes at least one internal module, the internal module providing a storage array controller function. The fabric connection operable connects the external device to the storage array controller, wherein the module of the controller is accessible by the external electronic device by directly converting from an external electronic device protocol to an internal storage array controller protocol suitable for communicating with the internal module.

In a third aspect of the present invention, an apparatus includes a first external device and a second external device suitable for providing a function, a controller, and a fabric connection. The controller includes at least one internal module, the internal module providing a controller function. The fabric connection includes a fabric switch communicatively connecting the first external device, the second external device and the controller, wherein the module of the controller is directly accessible via the fabric switch to at least one of the first external device and the second external device and the fabric connection communicatively connects the first external device to the second external device.

In a fourth aspect of the present invention, a disk array controller includes a controller and a bypass line. The controller includes at least one internal module, the internal module providing a controller function. The bypass line is directly connected with an internal interconnect of the controller through a switch, so that the at least one internal module of the controller is accessible directly by an input/output module by utilizing the bypass line.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Referring generally now to FIGS. 1 through 4, exemplary embodiments of the present invention are shown. As host and drive interface bandwidths increase, it puts a higher burden on electronic storage device controllers, such as disk array controllers, for increased bandwidth. Previous disk array controller architectures used peripheral component interconnect (PCI) as an internal interconnect between functional areas. However, such an interconnect had limitations such as connectivity, scalability and performance. A fabric interconnect may be utilized in a electronic data storage device system, such as a disk array, to provide dynamic expansion of modules, use of external memory systems, scalability of memory systems, scalability and/or connectivity of array controllers to create larger storage complexes, and the like. Further, a fabric connect may be utilized to provide a common fabric to describe both internal and external components.

Figure 1:
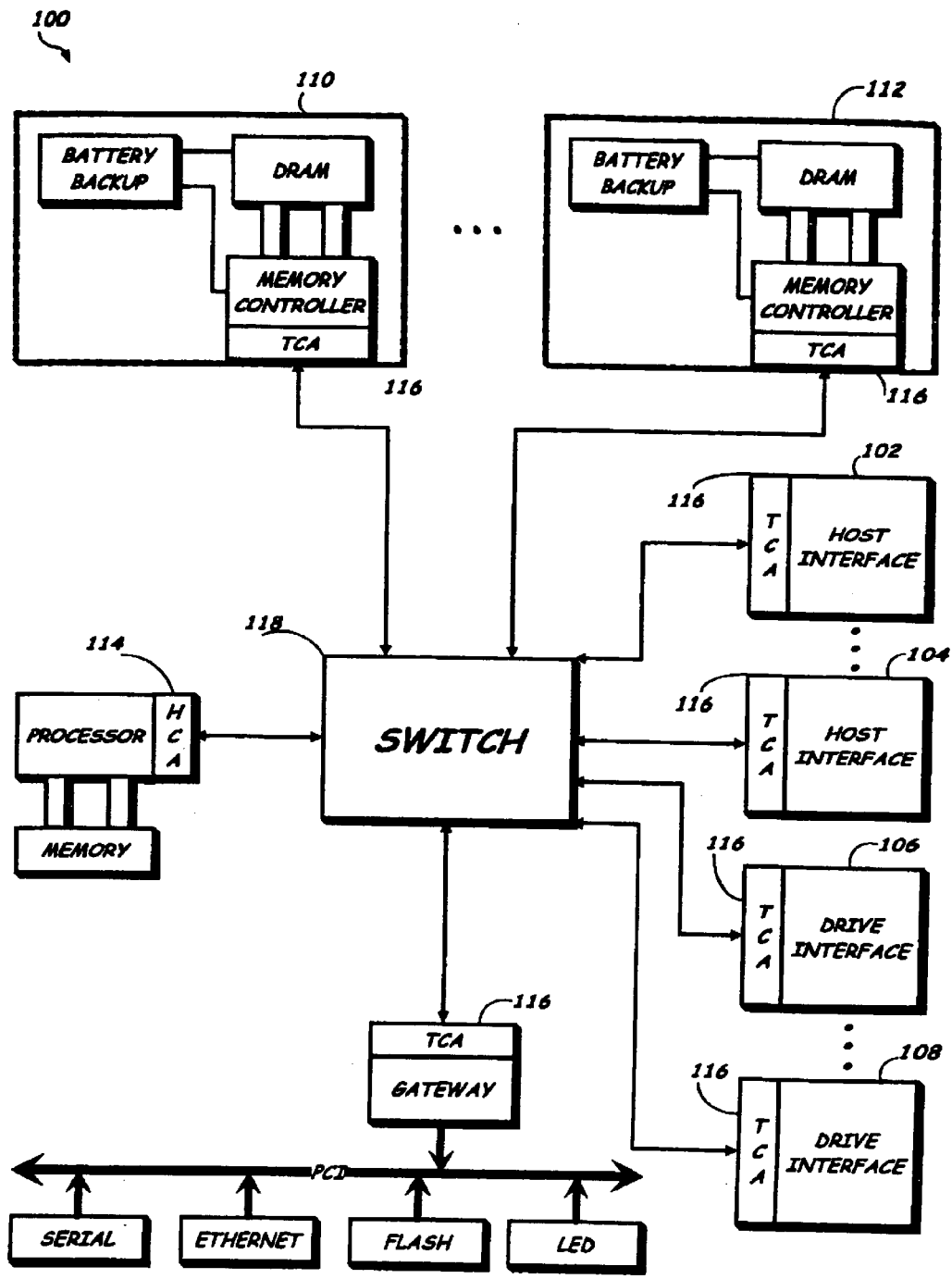
FIG. 1 is a highly diagrammatic block illustration of an exemplary embodiment of the present invention wherein a high bandwidth electronic data storage device architecture utilizes an interconnect fabric to provide connectivity.

Referring now to FIG. 1, an embodiment of the present invention is shown wherein a high bandwidth electronic data storage device architecture utilizes an interconnect fabric to provide connectivity. An electronic data storage device architecture 100 may include a plurality of electronic storage devices to provide data redundancy, such as a disk array arranged in a RAID array, and the like. To provide connectivity between components, the present invention may utilize a fabric interconnect.

A fabric interconnect of the present invention provides scalability by not limiting the number of host interfaces 102 & 104 and drive interfaces 106 & 108. Additionally, the number of modules in a controller 110 & 112 is not limited by the fabric like the physical limits PCI has on the number of connections to the bus.

To provide this increased functionality, the fabric interconnect may utilize messages, which in this instance is defined as a logical unit of work, to execute transactions. For example, message semantics may support memory operations such as remote direct memory access (RDMA) reads, writes, and channel operations such as send, receive, and the like.

Messages may be further segmented into packets. Data packets are an end-to-end fabric unit of transfer, e.g. packets are the routable unit of transfer. Hardware of the present invention may provide automatic message segmentation and re-assembly via packets. Packets include headers to identify the packet destination and the desired data. For example, packets may include a local route header (LRH), global route header (GRH), base transport header (BTH), extended transport header (ExTH), intermediate data, a message payload, an invariant CRC, a variant CRC, and the like.

A host channel adapter (HCA) 114 is generally a host concept configured for computing platforms. For example, a HCA may be configured for high-end devices, such as nodes, memory array controllers, and the like. Functions of a HCA may include implementation of a link protocol in hardware, implement software verbs, as a RDMA engine, work queue engine, memory registration and protection, and the like as contemplated by a person of ordinary skill in the art. Thus, the HCA 114 may act to implement high-end devices in the architecture of the present invention. However, there may be implementations where the full level of functionality of an HCA is not desired, such as specialized subsystems.

Target channel adapters (TCA) 116 may be configured for specialized subsystems. TCA may be configured as simpler than HCA so that it implements what is required to minimally support fabric architecture and device-specific functionality. For example, a TCA may be configured as a work queue engine, a link protocol engine, implement transport, and the like without departing from the spirit and scope of the present invention.

To ensure packet delivery within a fabric interconnect, a switch 118 may be provided. For instance, the switch may operate as a packet-switching element within a fabric subnet. Packets may be switched, for example, based on a local identifier (LID) within the local route header (LRH) as described previously. A router, which may be thought of as a switch, may also be provided to enable packet routing between systems, as will be discussed later.

Thus, by providing a fabric interconnect, a high bandwidth electronic data storage device controller architecture may be provided. For example, database transactions may be performed by using this packetization paradigm to provide dynamic expansion of modules, use of external memory systems, scalability of memory system and scalability and/or connectivity of array controllers to create larger storage complexes.

Figure 2A:
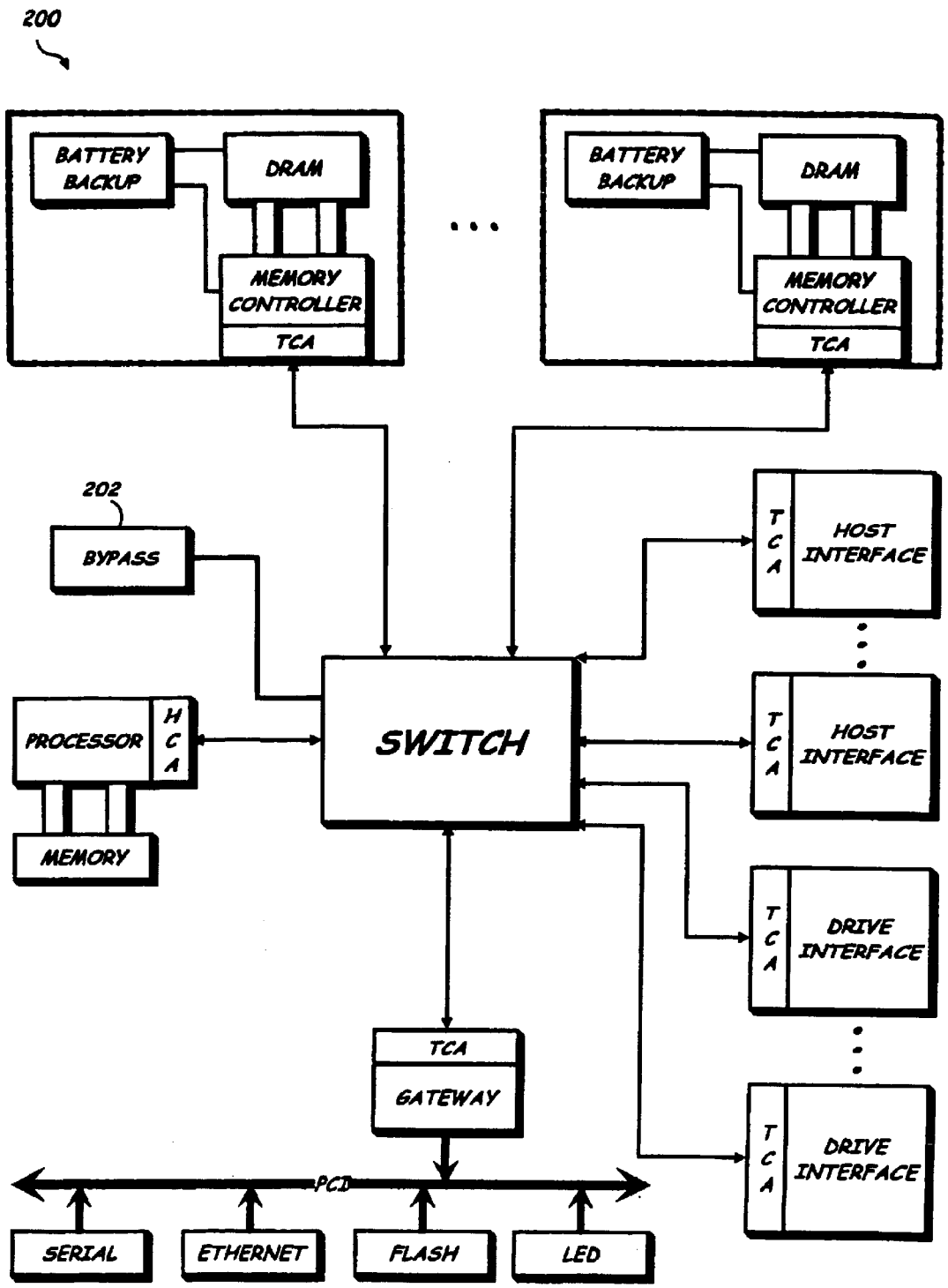
FIG. 2A is a highly diagrammatic block illustration of an exemplary embodiment of the present invention wherein a high bandwidth electronic data storage device architecture includes a bypass line to enable direct access by an input/output module.

Additionally, the fabric interconnect may be expanded to include devices external to the architecture, so that both internal and external components are accessible, as shown in FIG. 2A. For instance, large storage complex architectures may use a switched fabric to connect storage controllers to provide large storage capacities. Similarly, disk array control architectures may use a switched fabric to connect modules within the controller. By utilizing the present invention, a fabric may be employed in both a storage complex architecture and controller architectures, thereby increasing performance.

Referring generally now to FIGS. 2A through 4, exemplary embodiments of the present invention are shown. In order to use multiple controllers to create a large storage complex, an I/O module would have to address all the host interface chips on the associated controllers, making the interface very complex. However, the present invention may provide a bypass line suitable for connecting directly with the internal interconnect of the controller through a switch. For example, as shown in the system 200 depicted in FIG. 2A, a bypass line 202 is added to the controller architecture for interfacing with an I/O module. Using the bypass line 202, an I/O module may act as a host interface chip to access controller resources directly.

Figure 2B:
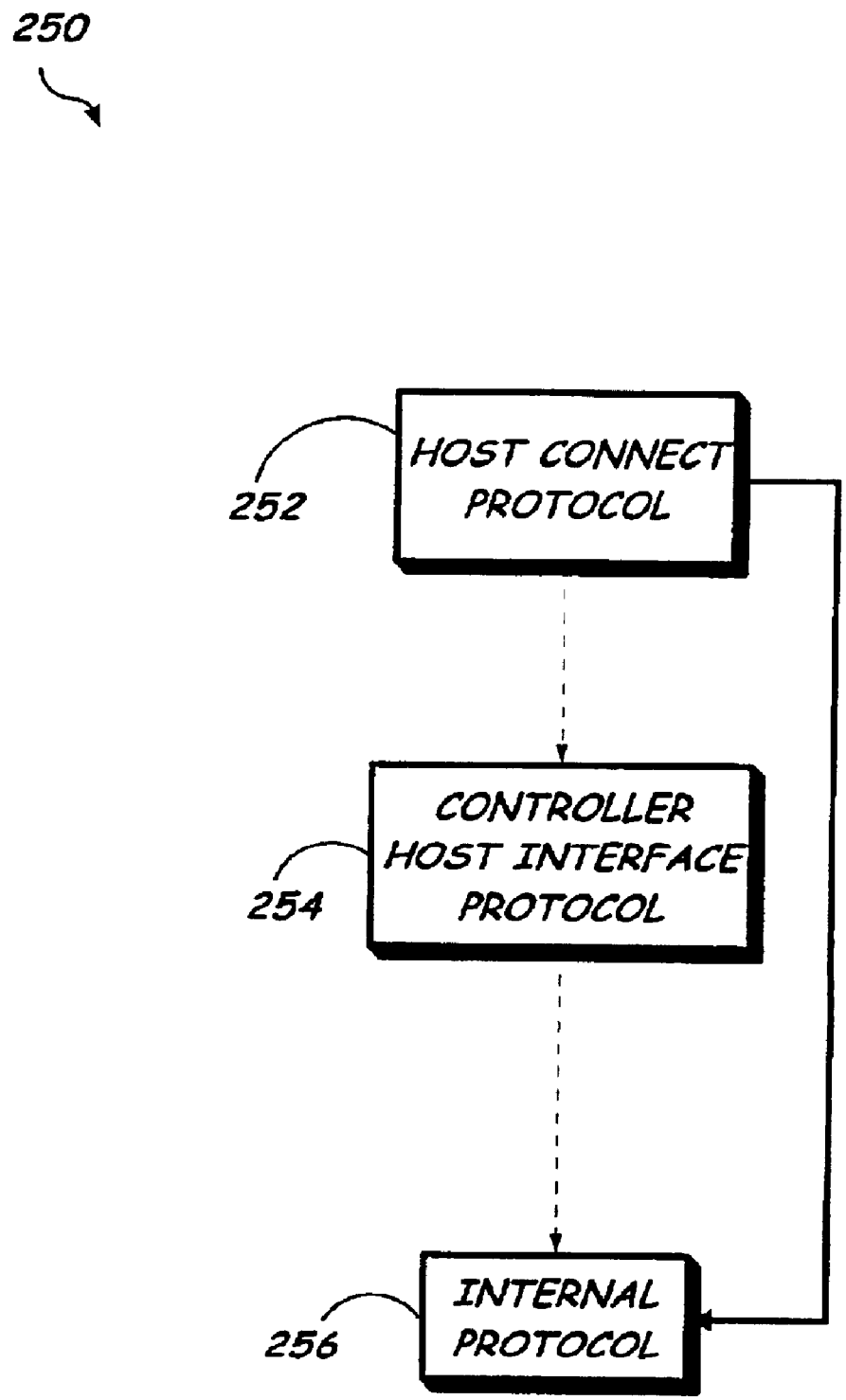
FIG. 2B is a flow chart illustrating an exemplary embodiment of the present invention wherein a host connect protocol is converted directly to an internal protocol.

Thus, as shown in FIG. 2B, by utilizing the present invention, there would not be a need to convert from a host connect protocol 252 to a controller host interface protocol 254 and then have the controller convert the controller host interface protocol 254 to an internal protocol 256 as previously required. In this way, direct mapping may be achieved from host interface protocol 252 to internal control protocol 256.

Figure 3:
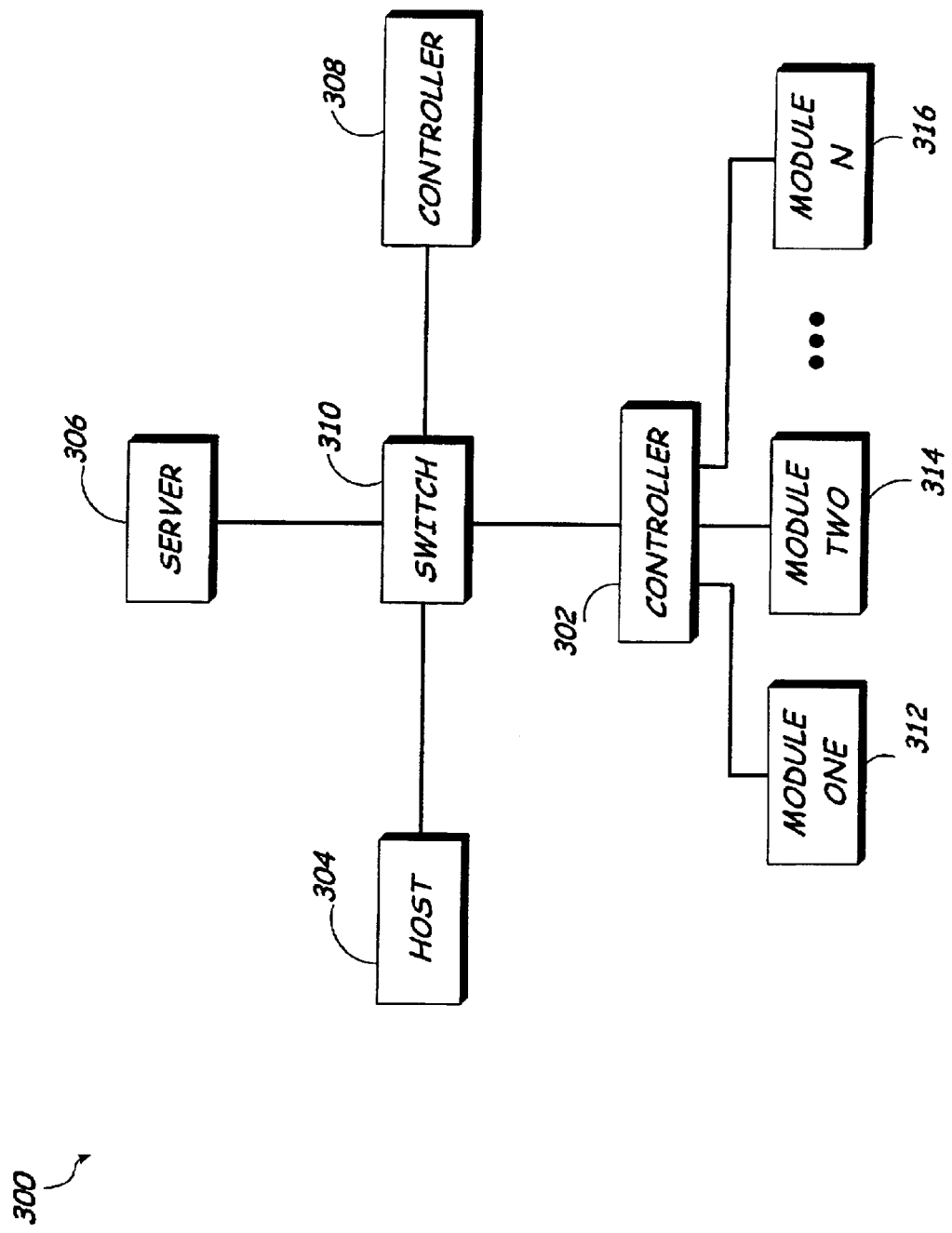
FIG. 3 is a block diagram illustrating an embodiment of the present invention wherein a fabric is utilized to enable direct access of both internal modules of a controller and access between external devices.

For example, referring now to FIG. 3, an embodiment 300 of the present invention is shown wherein a fabric is utilized to enable direct access of both internal modules of a controller and access between external devices. The fabric may extend through the controller as well as between controllers to provide a unified system to enable direct resource control. In this way, devices external to a controller 302, such as a host system 304, server 306, second controller 308 such as from an additional storage device provided for data redundancy, and the like as contemplated by a person of ordinary skill in the art, are connected via a fabric utilizing a switch 310. Further, the fabric extends to describe modules of the controller 302, such as module one 312, module two 314 and module N 316. Therefore, external devices, such as the host system 304, server 306, second controller 308, may directly access the modules 312, 314 and 316 without excessive converting of protocols.

Figure 4:
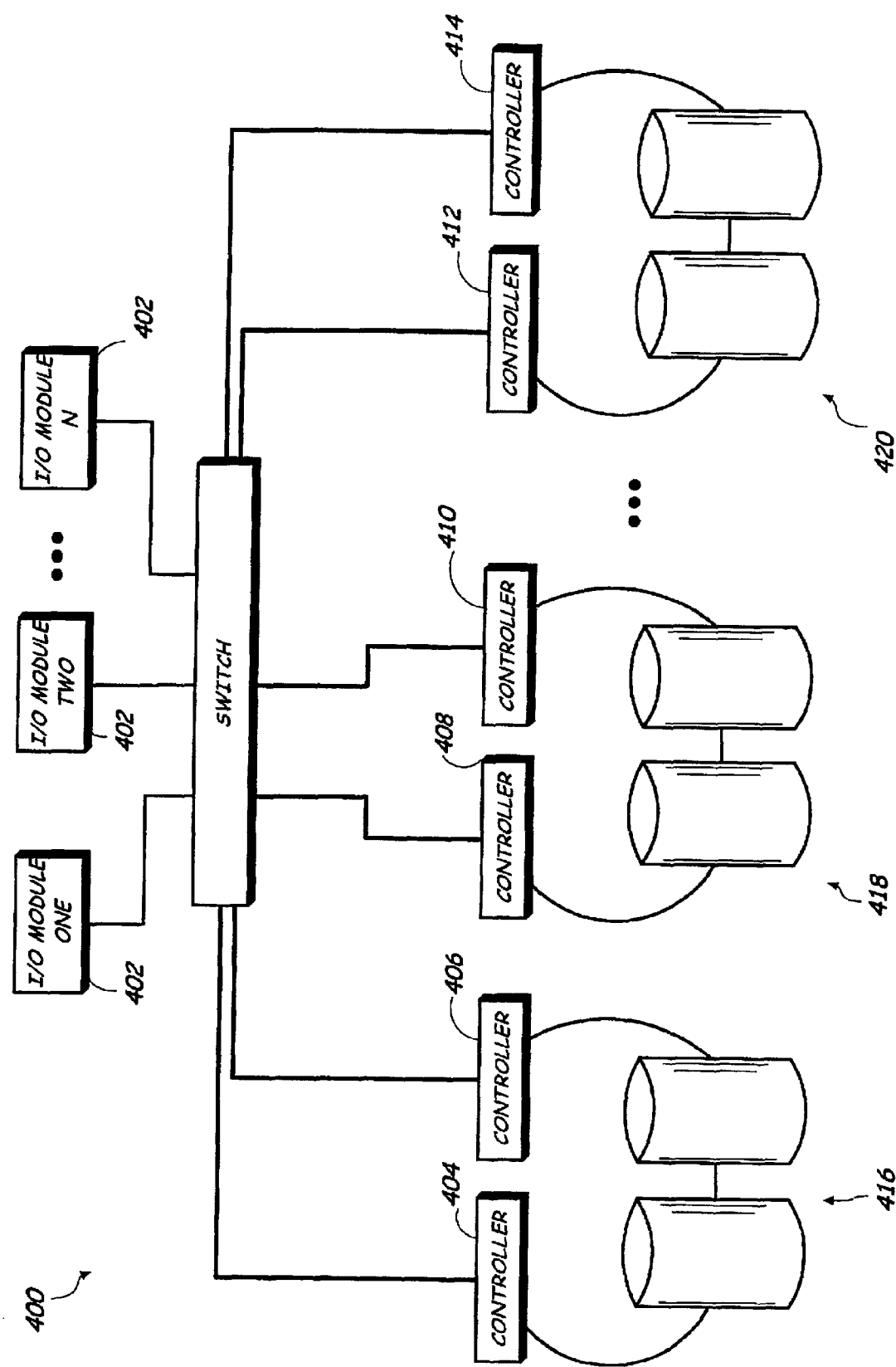
FIG. 4 is a block diagram depicting an embodiment of the present invention wherein a bypass line is utilized with multiple controllers and I/O modules.

Referring now to FIG. 4, an exemplary embodiment of the present invention is shown wherein a bypass line is utilized with multiple controllers and I/O modules. By utilizing a fabric used in the bypass as the fabric used as the controller interconnect, an efficient bypass of the present invention may be provided. For example, a plurality of I/O modules, such as modules utilized to provide a connection between external devices and the modules, may be provided 402. The I/O modules 402 may communicate and interface with controllers 404, 406, 408, 410, 412 and 414, in this instance, as utilized in storage systems, such as redundant electronic data storage systems 416, 418 & 420, utilizing a fabric connect. Further, a fabric connect may be used internally through a fabric interconnect. By utilizing the same fabric scheme both internally and externally, conversion of the data between protocols, as previously required, is no longer needed, thereby providing an efficient mechanism for the transfer of data. Thus, a host may directly access modules of a controller, such as a disk array controller, without converting protocols twice within the controller.

In this way, by utilizing packets, globally unique identifiers, and the like over a fabric connect both internally and externally, a flexible, scalable and dynamic electronic data storage system may be provided. For example, multiple data storage arrays may be provided to implement a storage complex, without being limited by the previous connection restraints encountered in PCI implementations. Additionally, multiple interfaces, external memory systems and array controllers may be utilized without encountering the bandwidth bottleneck of previous interconnects. Further, a single fabric connect may be provided to define both internal modules of a device and external devices. A variety of fabric connects are contemplated by the present invention without departing from the spirit and scope thereof, such as Infiniband, RapidIO and the like.

It is believed that the host interface bypass on a fabric based array controller of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. An apparatus, comprising:
   an external electronic device suitable for performing a function;
   a controller, the controller including at least one internal module, the internal module providing a controller function; and
   a fabric connection, including a fabric switch, for communicatively connecting the external device to the controller via the fabric switch, wherein the module of the controller is directly accessible by the external electronic device via the fabric connection.

2. The apparatus as described in claim 1, wherein the module is accessible by the external electronic device without using an interface chip.

3. The apparatus as described in claim 1, wherein the external electronic device is at least one of a host, second controller and server.

4. The apparatus as described in claim 1, wherein the fabric connection includes at least one of Infiniband and RapidIO.

5. The apparatus as described in claim 1, wherein the fabric switch operates as a packet-switching element within the fabric.

6. The apparatus as described in claim 1, wherein data stored in an electronic data storage device including the controller includes a globally unique identifier (GUID), so that the external device may identify a location of the stored data.

7. An apparatus, comprising:
   an external electronic device suitable for performing a function;
   a storage array controller, the storage array controller including at least one internal module, the internal module providing a storage array controller function; and
   a fabric connection, including a fabric switch, for operably connecting the external device to the storage array controller via the fabric switch, wherein the module of the controller is accessible by the external electronic device by directly converting from an external electronic device protocol to an internal storage array controller protocol suitable for communicating with the internal module.

8. The apparatus as described in claim 7, wherein the module is accessible by the external electronic device without using an interface chip.

9. The apparatus as described in claim 7, wherein the external electronic device is at least one of a host, second controller and server.

10. The apparatus as described in claim 7, wherein the fabric connection includes at least one of Infiniband and RapidIO.

11. The apparatus as described in claim 7, wherein the fabric switch operates as a packet-switching element within the fabric.

12. The apparatus as described in claim 7, wherein data stored in an electronic data storage device including the storage array controller includes a globally unique identifier (GUID), so that the external device may identify a location of the stored data.

13. An apparatus, comprising:
a first external device suitable for providing a function;
a second external device suitable for providing a function;
a controller, the controller including at least one internal module, the internal module providing a controller function; and
a fabric connection, including a fabric switch, for operably connecting the first external device, the second external device and the controller via the fabric switch, wherein the module of the controller is directly accessible via the fabric switch to at least one of the first external device and the second external device and the fabric connection communicatively connects the first external device to the second external device.

14. The apparatus as described in claim 13, wherein the module is accessible by the first external electronic device without using an interface chip.

15. The apparatus as described in claim 13, wherein at least one of the first external device and the second external electronic device is at least one of a host, second controller and server.

16. The apparatus as described in claim 13, wherein the fabric connection includes at least one of Infiniband and RapidIO.

17. The apparatus as described in claim 13, wherein the fabric switch operates as a packet-switching element within the fabric.

18. A disk array controller, comprising:
a controller, the controller including at least one internal module, the internal module providing a controller function; and
a bypass line directly connected with an internal interconnect of the controller through a switch;
wherein the at least one internal module of the controller is accessible directly by an input/output module by utilizing the bypass line.

* * * * *